(12) United States Patent
Ehrlich

(10) Patent No.: US 12,398,977 B2
(45) Date of Patent: Aug. 26, 2025

(54) SYSTEM AND METHOD FOR ZEROING OF SMART AIMING DEVICE

(71) Applicant: SMART SHOOTER LTD., Yagur (IL)

(72) Inventor: Avshalom Ehrlich, Kibbutz Ramat Hashofet (IL)

(73) Assignee: SMART SHOOTER LTD., Yagur (IL)

( * ) Notice: Subject to any disclaimer, the term of this patent is extended or adjusted under 35 U.S.C. 154(b) by 0 days.

(21) Appl. No.: 18/567,192

(22) PCT Filed: Jun. 6, 2022

(86) PCT No.: PCT/IL2022/050599
§ 371 (c)(1),
(2) Date: Dec. 5, 2023

(87) PCT Pub. No.: WO2022/259241
PCT Pub. Date: Dec. 15, 2022

(65) Prior Publication Data
US 2024/0271908 A1  Aug. 15, 2024

(30) Foreign Application Priority Data

Jun. 7, 2021 (IL) .......................................... 283793

(51) Int. Cl.
*F41G 1/54* (2006.01)
*F41G 1/473* (2006.01)
(Continued)

(52) U.S. Cl.
CPC ............ *F41G 1/545* (2013.01); *F41G 1/473* (2013.01); *F41G 3/06* (2013.01); *F41G 3/08* (2013.01)

(58) Field of Classification Search
CPC . F41G 1/545; F41G 1/473; F41G 3/06; F41G 3/08
(Continued)

(56) References Cited

U.S. PATENT DOCUMENTS 8,651,381 B2   2/2014 Rudich
9,127,909 B2   9/2015 Ehrlich
(Continued)

FOREIGN PATENT DOCUMENTS

EP   1804017 A1 * 7/2007 ............... F41G 1/38
EP   1856471 B1   8/2013
(Continued)

OTHER PUBLICATIONS

Timm, "How to Adjust Rifle Scope Reticles," Apr. 2017, URL= https://goneoutdoors.com/adjust-rifle-scope-reticles-8191171.html, retrieved Dec. 1, 2023. (3 pages).

*Primary Examiner* — Samir Abdosh
(74) *Attorney, Agent, or Firm* — Seed Intellectual Property Law Group LLP

(57) ABSTRACT

A smart aiming device includes an image sensor, a processor, and an adjustable reticle. A method of zeroing the smart aiming device includes: activating a dedicated zeroing mode: shooting at least one bullet on a zeroing target while aiming the firearm on the target using the reticle to determine an expected point of impact of the bullet on the zeroing target: imaging the zeroing target with the image sensor: identifying a location of at least one bullet hole formed by the bullet on the target, and calculating a distance between each bullet hole and the expected point of impact; and adjusting a location of the reticle respective to the bore of the firearm based on the calculated at least one distance, to thereby indicate a zeroed point of impact on the target on which a subsequent bullet shot from the firearm is expected to impact.

17 Claims, 11 Drawing Sheets

(51) Int. Cl.
*F41G 3/06* (2006.01)
*F41G 3/08* (2006.01)

(58) Field of Classification Search
USPC .......................................................... 42/114
See application file for complete search history.

(56) References Cited

U.S. PATENT DOCUMENTS

| | | | |
|---|---|---|---|
| 9,285,189 B1 | 3/2016 | Zhang et al. | |
| 10,054,397 B1 | 8/2018 | Reimer | |
| 10,097,764 B2 | 10/2018 | Ehrlich | |
| 10,184,758 B2* | 1/2019 | Lyren | F41G 3/12 |
| 10,365,068 B2 | 7/2019 | Ehrlich | |
| 10,443,981 B2 | 10/2019 | Tinichigiu et al. | |
| 10,746,508 B2 | 8/2020 | Vardi | |
| 2006/0010760 A1* | 1/2006 | Perkins | F41G 1/38 |
| | | | 42/142 |
| 2008/0022575 A1* | 1/2008 | Drexler | F41G 1/38 |
| | | | 42/111 |
| 2011/0315767 A1 | 12/2011 | Lowrance | |
| 2012/0090216 A1 | 4/2012 | Li | |
| 2012/0097741 A1 | 4/2012 | Karcher | |
| 2013/0199074 A1* | 8/2013 | Paterson | F41G 1/38 |
| | | | 42/122 |
| 2014/0075820 A1 | 3/2014 | Ben-Ami | |
| 2015/0106046 A1* | 4/2015 | Chen | G01B 11/00 |
| | | | 702/94 |
| 2015/0176948 A1* | 6/2015 | Varshneya | F41G 1/00 |
| | | | 235/404 |
| 2015/0345906 A1* | 12/2015 | Varshneya | F41G 3/165 |
| | | | 235/404 |
| 2018/0224651 A1 | 8/2018 | Havens et al. | |
| 2019/0226801 A1 | 7/2019 | Graham | |
| 2020/0049457 A1 | 2/2020 | Tinichigiu et al. | |
| 2021/0055536 A1* | 2/2021 | DeAngelis | F41G 1/30 |

FOREIGN PATENT DOCUMENTS

| | | | | |
|---|---|---|---|---|
| JP | 3878360 B2 | 2/2007 | | |
| WO | 2022251896 A1 | 12/2022 | | |
| WO | WO-2022259241 A1 * | 12/2022 | | F41G 1/473 |
| WO | WO-2023042195 A1 * | 3/2023 | | F41A 17/08 |

* cited by examiner

SYSTEM AND METHOD FOR ZEROING OF SMART AIMING DEVICE

FIELD OF THE INVENTION

The present disclosure, in some embodiments, concerns a system and a method for zeroing of a smart aiming device, and more specifically, but not exclusively, to a smart aiming device having an image sensor and a processor that may be used to automatically zero the smart aiming device.

BACKGROUND OF THE INVENTION

Zeroing of a firearm refers to a process of adjusting a sight to the firearm so that a projectile fired from the firearm (such as a bullet) will hit in a predictable place, such as a position of the aiming reticle of the sight. The sight is adjusted so that a point of aim (as indicated, for example, by a reticle) intersects the projectile trajectory at a designated distance from the firearm. Typically, zeroing is performed by firing a group of bullets at a location indicated by a reticle, calculating a distance between the weighted center of the bullets (often referred to as Point of Impact or POI) and the point of aim as indicated by the sight, adjusting the sight so that the reticle is now aligned with the expected point of impact, and repeating the process until the POI is centered on the point of aim.

Various firearm sights are known. A basic form of sight is an iron sight. The iron sight includes a metallic reticle affixed to the barrel of the firearm, whose location may be manually adjusted with a series of knobs or dials. More recently, reflector or "red dot" sights have been developed. These sights project a dot-style illuminated reticle that stays in alignment with the weapon, regardless of eye position. Many sights that rely on magnification include an etched reticle sight, in which the reticle is etched onto an optical glass through which the user views the target.

Calculating a weighted center of a group of bullets and adjusting the reticle based on the weighted center have classically been performed manually. For example, after firing a group of shots at a target, a user would walk to the target, find the weighted center of the shots using a pencil or a marker, determine a distance between a weighted center of the shots and the aim point, and calculate the adjustment to the sight accordingly. More recently, support tools, some of which utilize image processing software, were developed to assist in calculation of the zeroing adjustments. For example, the user may approach the target with a mobile device having an image sensor, and capture an image of the target with multiple bullet impact holes. Processing circuitry on the mobile device calculates the required adjustment to the sight and issues instructions to the user to adjust the sight mechanically.

Fire control systems (FCS) have been developed that apply image recognition technology in order to assist firearm users in aiming. A fire control system may include an integrated image sensor and processor. The processor may include image processing software that identifies potential targets within a scene, allows to "locking" onto these targets, and calculates the proper aimpoint that will ensure a hit on a target. The fire control system may assist in timing the discharge of a bullet by the processor, to a moment when the firearm is properly aimed.

SUMMARY OF THE INVENTION

To date, advances in smart firearm technology have been focused on improving performance of the firearm after it has been zeroed. However, there has not been a corresponding application of smart firearm technology for use in zeroing firearms.

Accordingly, in certain embodiments, the present disclosure discloses a smart zeroing technology. More specifically, a firearm smart aiming device has a built-in ability to calculate and execute zeroing corrections in an automated fashion, without a need in any kind for additional measurement tools or devices. These tasks may be performed by using a dedicated zeroing mode that might differ in some aspects from how the smart aiming device is used during standard operation of the firearm. In additional advantageous embodiments, the smart aiming device, and therefore its zeroing system is integrated with a fire control system, so as to minimize the likelihood of errant shots resulting from poor technique and firing mistakes during the zeroing process, and so as to enable easier and more accurate zeroing.

According to a first aspect, a method for zeroing a smart aiming device is disclosed. The smart aiming device includes an image sensor, a processor, and an adjustable reticle for aiming the aiming device. The method includes the following steps: activating a dedicated zeroing mode; shooting at least one bullet on a zeroing target while aiming the firearm on the target using the reticle to determine an expected point of impact of said at least one bullet on the zeroing target; imaging the zeroing target with the image sensor; based on an image captured by the image sensor, identifying a location of at least one bullet hole formed by the at least one bullet on the target, and calculating a distance between each bullet hole and the expected point of impact; calculating a zeroing adjustment of a location of the reticle respective to a bore of the firearm based on the calculated at least one distance, for thereby indicating a zeroed point of impact on the target on which a subsequent bullet shot from the firearm is expected to impact, and performing the zeroing adjustment. Advantageously, the method utilizes a smart aiming device that combines, within a single device, the image sensor, the reticle, and the processor used to calculate the adjustment of the reticle, and therefore eliminates the need for any additional equipment. The zeroing accordingly is performed efficiently and in an automated fashion.

In another implementation according to the first aspect, the at least one bullet includes at least two bullets, and the method further includes: following firing of a first bullet at the target, identifying a point of impact of the fired bullet on the target, calculating the distance between the point of impact and the expected point of impact, and calculating the zeroing adjustment of the reticle based on the calculated distance; following firing of each subsequent bullet after the first bullet, calculating a weighted center of the points of impact of the first bullet and each subsequent bullet, calculating a distance between the weighted center and the expected point of impact, and updating the zeroing adjustment. These steps may optionally be performed in an automated fashion by the processor, thereby enabling a more accurate zeroing on the basis of multiple shots in a shot group, while permitting the user to stop the zeroing process after he or she is satisfied with the result.

In another implementation according to the first aspect, the at least one bullet includes at least two bullets, and the method further includes: following firing of all of the at least two bullets at the target, identifying a point of impact of all of the bullets on the target, calculating a weighted center of the points of impact, and calculating a distance between the weighted center and the expected point of impact, and calculating the zeroing adjustment based on the calculated distance between the weighted center and the expected point of impact. Performing the zeroing calculations only after completing all of the shots minimizes the required calculations.

In another implementation according to the first aspect, the activating step includes imaging the zeroing target, identifying the zeroing target within the image; and, upon identifying the imaged zeroing target, automatically entering the dedicated zeroing mode. Proceeding to zeroing mode automatically promotes quick and efficient zeroing.

In another implementation according to the first aspect, the reticle is a digital reticle. Optionally, the method further includes determining a position of the digital reticle taking into account at least one of range to the target, type of ammunition, muzzle velocity, environmental parameters, and height of the smart aiming device, and projecting the digital reticle onto the field of view based on this determining, so that a point of aim corresponds with the projected point of impact. Advantageously, the smart aiming device may project the digital reticle within the field of view taking into account not only correction of the reticle based on the zeroing process, but also the above-listed parameters of the firearm and environment, to thereby ensure that the reticle is positioned at an appropriate projected point of impact. Notably, aiming devices that are not integrated with a processor are unable to take these factors into consideration when aiming the reticle. Thus, the true expected point of impact differs from the point of impact projected by the reticle, because the positioning of the reticle does not take into account configuration of the firearm. By contrast, the smart aiming device that is able to take into account parameters of the firearm always directs the reticle at the true point of aim.

In another implementation according to the first aspect, the step of performing the zeroing adjustment includes issuing, with the processor, a proposed adjustment for the digital reticle for approval by a user, and approving the proposed adjustment. This approving of the proposed adjustment is performed by the user. User approval may be desirable for the purposes of quality control.

In another implementation according to the first aspect, the reticle is a mechanical reticle, and the step of performing the zeroing adjustment includes providing guidance to a user to mechanically adjust a location of the mechanical reticle, and executing the instructions. For example, the guidance may be displayed on a screen of the smart aiming device, and the user may execute the instructions by turning knobs or dials. Advantageously, the smart aiming device may be used to calculate adjustment of mechanical sights in addition to digital sights.

In another implementation according to the first aspect, the reticle comprises both a mechanical reticle and a digital reticle, and the method comprises first performing the zeroing adjustment on the digital reticle, and subsequently mechanically adjusting the mechanical reticle to match the zeroing adjustment of the digital reticle. Advantageously, user may use the mechanical reticle even when the digital reticle is unavailable. In addition, there is no need to communicate instructions to a user as to how to zero the mechanical reticle, because the user is able to use the knobs and dials of the mechanical reticle to match the digital reticle.

In another implementation according to the first aspect, the expected point of impact is a predetermined point on the zeroing target. For example, the image processor may identify patterns on the target, and, based on these patterns, determine that the user is aiming at a particular pattern within the target, and identify this pattern as the expected point of impact.

In another implementation according to first aspect, the expected point of impact is a direction of the reticle at a time prior to bullet discharge. In such scenarios, the system determines the expected point of impact based on where the sight was pointed prior to discharge of the bullet. This determination may require robust computing resources and in particular may rely on features of a fire control system that is able to determine an expected point of impact prior to shooting.

In another implementation according to the first aspect, the method further comprises, prior to the imaging step, changing or adding a filter or aperture to a lens assembly of the image sensor, or refocusing a movable lens assembly of the image sensor, to enable a properly focused view of the target. In this way, the lens assembly may be used in place of walking up to the target to examine the bullet holes.

In another implementation according to the first aspect, the method further comprises, with a fire control system having a firing processor, locking onto the zeroing target, tracking the zeroing target, and timing a firing of the firearm so as to fire the firearm when the firing processor determines that the locked-on zeroing target will be hit in a desired hit area. Advantageously, use of the firing processor minimizes the range of errant shots from the desired aimpoint that may be taken with the firearm during the zeroing process, and thus both saves ammunition and simplifies the calculation of the zeroing.

According to a second aspect, a method for zeroing a smart aiming device on a firearm is disclosed. The smart aiming device includes an image sensor, a processor, and an adjustable reticle for aiming the aiming device. The method includes: shooting at least one bullet while aiming the firearm using the reticle to determine an expected point of impact of the at least one bullet; imaging a bullet hit region with the image sensor; based on an image captured by the image sensor, identifying an exact bullet impact location by identifying changed features in the bullet hit region, and calculating a distance between each at least one bullet impact location and each corresponding expected point of impact; calculating a zeroing adjustment of a location of the reticle respective to a bore of the firearm, based on the calculated distance, to thereby indicate a zeroed point of impact on which a subsequent bullet shot from the firearm is expected to impact, and performing the zeroing adjustment. Advantageously, using the method as set forth herein, the smart aiming device may be zeroed not only when it is aimed against a target, but also when it is in the field.

In another implementation according to the second aspect, the reticle is a digital reticle, and the step of performing the zeroing adjustment includes issuing, with the processor, a proposed adjustment for the digital reticle for approval by a user, and approving the proposed adjustment. The approving is performed by the user.

In another implementation according to the second aspect, the reticle is a mechanical reticle, and the step of performing the zeroing adjustment includes providing guidance to a user to mechanically adjust a location of the mechanical reticle, and executing these instructions. The executing is performed by the user.

According to a third aspect, a system for zeroing a smart aiming device installed on a firearm is disclosed. The system includes an adjustable reticle; an image sensor configured to capture images of a target region, wherein the reticle is not visible on the captured images; an optical window for viewing a target therethrough via at least one of an optical lens or a micro-display of a video of the target region captured by the image sensor injected into the optical window. The system further includes a processor and a non-transitory computer readable medium having stored thereon software instructions that, when executed by the processor, causes the processor to perform the following steps: activating a dedicated zeroing mode; imaging the zeroing target with the image sensor; following shooting of at least one bullet at the zeroing target, identifying a location of at least one bullet hole formed by the at least one bullet on the target, based on an image imaged by the image sensor, and calculating a distance between each bullet hole and the expected point of impact; determining an expected point of impact of at least one bullet on a zeroing target; and determining a zeroing adjustment of the reticle respective to a bore of the firearm, based on the calculated at least one distance, such that following the adjustment the reticle indicates a zeroed point of impact on the target on which a subsequent bullet shot from the firearm is expected to impact. Advantageously, the smart aiming device combines, on one apparatus fixed on the firearm, the image sensor used to image the shot group, the reticle, and the processor used to calculate the adjustment of the reticle. The zeroing accordingly may proceed efficiently and in an integrated manner. In addition, the system may be integrated into a fire control system, which may use the image sensor to scan the field of view in order to identify and lock on to targets.

In another implementation according to the third aspect, the system is further configured, following firing of a first bullet at the target, to identify a point of impact of the fired bullet on the target, calculate the distance between the point of impact and the expected point of impact, and determine the zeroing adjustment of the reticle based on the calculated distance; and following firing of each subsequent bullet after the first bullet, calculate a weighted center of the points of impact of the first bullet and each subsequent bullet, calculate a distance between the weighted center and the expected point of impact, and update the zeroing adjustment.

In another implementation according to the third aspect, the system is further configured, following firing of at least two bullets at the target, to identify a point of impact of all of the bullets on the target, calculate a weighted center of the points of impact, and calculate a distance between the weighted center and the expected point of impact; and determine the zeroing adjustment based on the calculated distance between the weighted center and the expected point of impact.

In another implementation according to the third aspect, the system is further configured, following firing of at least two bullets at the target, to identify a location of a point of impact of each bullet on the target, calculate a weighted center of the points of impact, calculate a distance between the weighted center and the expected points of impact, and perform the determining step based on the calculation between the weighted center and the determined point of impact. The system is thus capable of performing a more accurate zeroing on the basis of multiple shots in a shot group, all in an automated fashion.

In another implementation according to the third aspect, the system is configured to activate the dedicated zeroing mode by imaging the zeroing target, and identifying the zeroing target within the image. Upon identifying the imaged zeroed target, the system is configured to automatically enter the dedicated zeroing mode. Advantageously, zeroing mode is entered automatically when a target is identified, saving time and effort by the user. In alternative embodiments, a user may cause the system to activate the dedicated zeroing mode manually, through a user interface.

In another implementation according to the third aspect, the reticle is a digital reticle. Optionally, the processor is configured to determine a position of the digital reticle taking into account at least one of range to the target, type of ammunition, muzzle velocity, environmental parameters, and height of the smart aiming device, and to project the digital reticle onto a field of view in the optical window based on such determining, so that a point of aim corresponds with the projected point of impact. Advantageously, the smart aiming device may project the digital reticle within the field of view taking into account not only correction of the reticle based on the zeroing process, but also the above-listed parameters of the firearm and environment, to thereby ensure that the reticle is positioned at the correct projected point of impact based on these parameters.

In another implementation according to the third aspect, the system is further configured to propose a correction to the display of the reticle according to the determined adjustment, and to execute said correction upon approval by a user. Advantageously, the user may thus approve any adjustment to the sight prior to implementation on the aiming device.

Optionally, the system is further configured to correct the display of the reticle automatically in accordance with the determined adjustment.

In another implementation according to the third aspect, the reticle is a mechanical reticle, and the system is further configured to provide guidance to a user to mechanically adjust a location of the mechanical reticle.

In another implementation according to the third aspect, the system further comprises a plurality of filters or apertures for an optical element of the image sensor, or a moving lens assembly for the optical element, so the image sensor is able to view the target at a proper focus.

In another implementation according to the third aspect, the system includes a fire control system. The fire control system includes user controls for locking onto a hit area within the target, an epsilon logic module configured to track the hit area, and a firing processor configured to time a firing of the firearm so that the firearm will fire when the firing processor determines that the locked-on zeroing target will be hit in a desired hit area.

DETAILED DESCRIPTION OF THE INVENTION

Figure 1A:
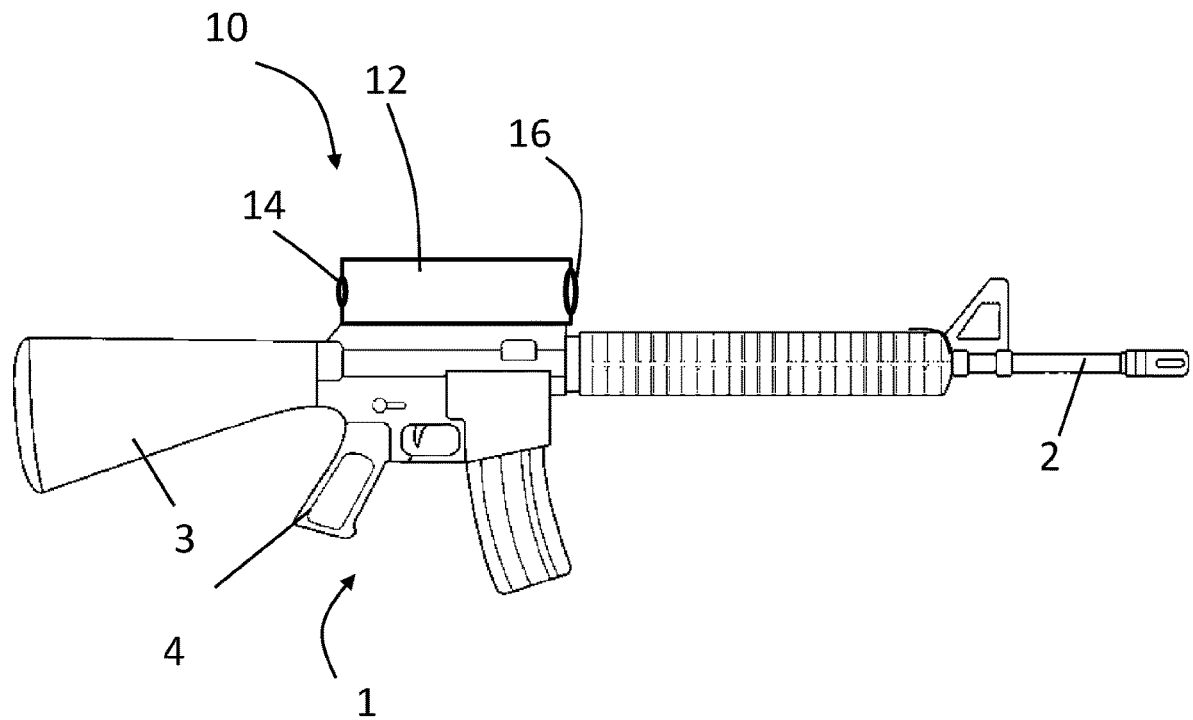
FIG. 1A is a schematic diagram illustrating externally visible components of a smart aiming device affixed to a firearm, the smart aiming device having a digital reticle, according to embodiments of the present disclosure.

The present disclosure, in some embodiments, concerns a system and a method for zeroing of a smart aiming device, and more specifically, but not exclusively, to a smart aiming device having an image sensor and a processor that may be used to automatically zero the smart aiming device.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1B:
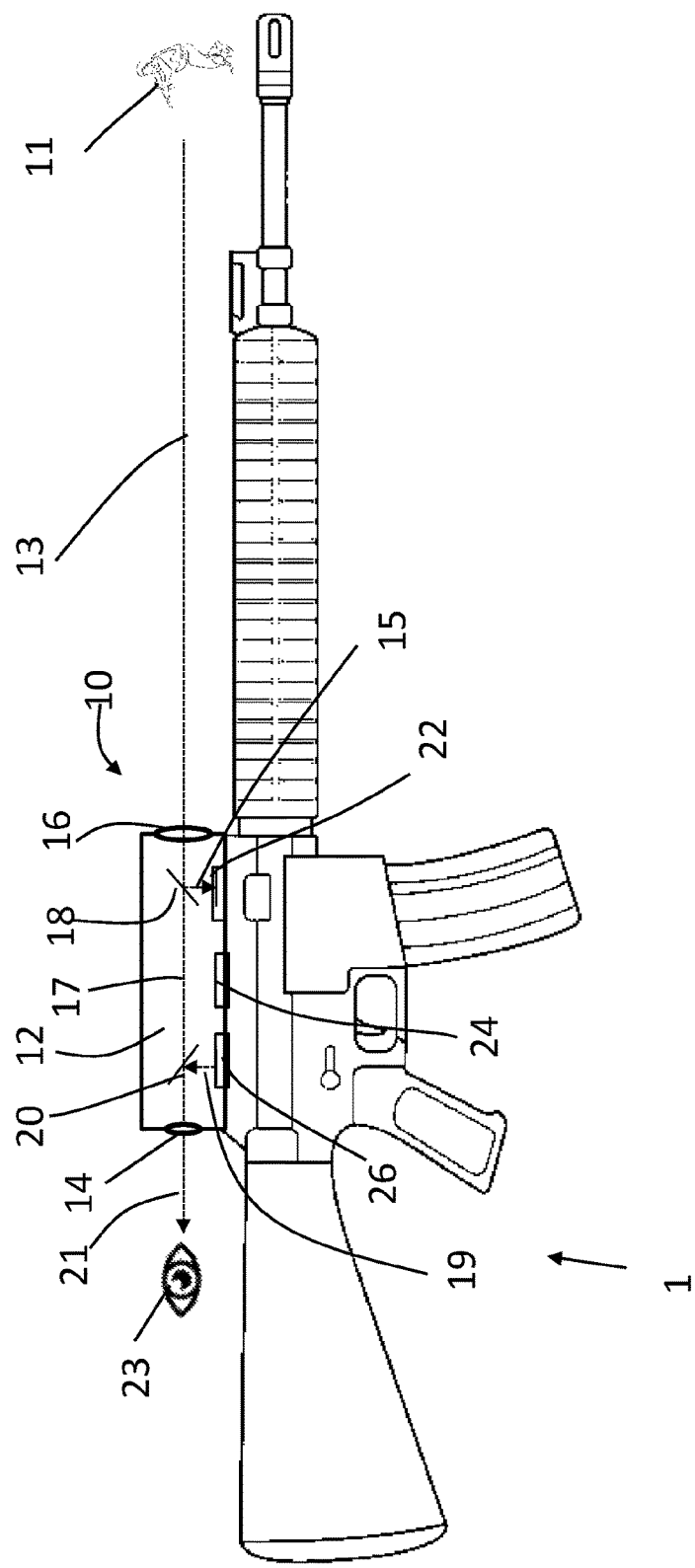
FIG. 1B is a schematic diagram showing internal components of the smart aiming device of FIG. 1A, according to embodiments of the present disclosure.

Referring to FIGS. 1A and 1B, smart aiming device 10 is affixed onto firearm 1, and generally aligned with bore 2 of the firearm. Bore 2 is also known as a barrel. Firearm 1 is depicted as a rifle; however, smart aiming device 10 may be applied onto any suitable firearm, such as a pistol, a handgun, a shotgun, a machine gun, a carbine, or a revolver.

Smart aiming device 10 includes housing 12, which may be substantially tubular, and which may be made of any suitable material. Ocular 14 is arranged at the rear of device 10, closer to the stock 3 and grip 4 of the firearm. Objective lens 16 is arranged at the front of device 10, closer to the barrel 2 of the firearm 1. Objective lens 16 is also referred to herein as a lens assembly. Objective lens 16 is depicted schematically as a single lens; however, Objective lens 16 may consist of multiple lenses. Objective lens 16 may be adjustable, to enable focusing and/or zooming of the smart aiming device 10 on targets at different distances from the shooter. Optionally, objective lens 16 includes one or more filters or apertures that may be adjusted by the user, or an adjustable focus control, in order to change the focus of objective lens 16. Changing the focus of objective lens 16 may be desired, for example, in order to zero at different distances (for example, between 25 and 200 yards.

Smart aiming device 10 may optionally include additional lens assemblies within housing 12, in addition to ocular 14 and objective 16. These additional lenses may also be used for zooming the view of the smart aiming device 12.

Referring to FIG. 1B, smart aiming device 10 includes a beam splitter 18. Beam splitter 18 may be constructed in any manner that is known to those of skill in the art. For example, beam splitter 18 may be made of two triangular glass prisms which are glued together at their base using polyester, epoxy, or urethane-based adhesives.

As illustrated in FIG. 1B, incident light reflected off of target 11 enters lens assembly 16 as light beam 13. When light beam 13 reaches beam splitter 18, the light beam 13 is split into light beam 15 and light beam 17.

Light beam 15 reaches image sensor 22. Image sensor 22 may include type of image sensor that is known or that may become known, such as a CMOS sensor, a CCD sensor, a forward-looking infra-red sensor, a multispectral or hyperspectral camera, or any other sensor suitable for the functions described herein. Image sensor 22 is used to capture an image of the target 11.

The image sensor 22 is integrated with controller 24. Controller 24 includes a processor and a non-transitory computer-readable medium having stored thereon software instructions, that when executed by the processor, causes the processor to perform various functions, as set forth herein.

In preferred embodiments, controller 24 specifically includes instructions for operation of a fire control system with a firing processor. As used in the present disclosure, the term "fire control system" refers to a system that controls when a firearm is discharged. Such a system detects and locks onto a target, and tracks the point of aim of the firearm relative to the target. Once the target is acquired, or locked onto, the system waits for the firearm to be correctly oriented and positioned (for example, in direction or elevation) before allowing the firearm to discharge. In exemplary embodiments, even when a user holds down the trigger, the weapon will only discharge when the weapon is pointing in the right direction. The controller takes into account not only the relative position of the firearm to the target, but also factors such as distance, angle incline (ballistics), wind, air pressure, and involuntary movement of the firearm caused by the user. In exemplary embodiments, the controller 24 identifies a specific target zone, or "epsilon," at a central location on the target. For example, if the target is a human, the target zone may be defined as the human's chest. The controller 24 may also include an epsilon logic module that determines whether a point of aim of the firearm 1 falls within the target zone.

The image sensor 22, controller 24, and epsilon logic module may be substantially similar to those described in U.S. Pat. No. 9,127,909, entitled "Firearm Aiming System with Range Finder, and Method of Acquiring a Target," U.S. Pat. No. 10,097,764, entitled "Firearm, Aiming System Therefor, Method of Operating the Firearm and Method of Reducing the Probability of Missing a Target," and Israeli patent application No. 281842, filed Mar. 25, 2021, entitled "Telescopic Rifle Sight", each of which is assigned to the assignee of the pending application, and the contents of which are incorporated by reference as if fully set forth herein.

Continuing to refer to FIG. 1B, aiming device 10 includes microdisplay 26. Microdisplay 26 may comprise, for example, an OLED or LCD screen. Alternatively, microdisplay 26 includes an LED suitable for generating an LED sight, also known as a "red dot sight." Microdisplay 26 projects a digital reticle along light path 19 into the housing 12 of aiming device 10. As used in the present disclosure, the term "digital reticle" refers to any electronically created reticle. The digital reticle may be displayed in any shape suitable for identifying a target, such as a circle or crosshairs. Optionally, the microdisplay 26 is configured to change the shape of the display of the digital reticle according to instructions from the fire control system, for example, depending on whether the firearm 1 is properly aimed at the target zone within the target. Beam splitter 20 refracts at least a portion of the display from the microdisplay toward light path 21. Light path 21 thus includes both light from the lens assembly 16 and light from microdisplay 26, combined into a single view. User 23 views the light through optical window 14. Accordingly, the user 23 sees an image of the digital reticle superimposed over an image of the target 11.

In view of the foregoing, it is apparent that the digital reticle may be adjusted within the field of view of the user 23, without any corresponding movement of the housing 12 of smart aiming device 10. For example, the digital reticle may be displayed from different locations within the microdisplay 26. Of course, this is not the only way to adjust the reticle relative to the bore 2 of the firearm; alternatively, it is possible to move the entire housing 12, relative to bore 2, for example with dials or knobs. It is further apparent that the digital reticle is not visible on the images of the target 11 captured by image sensor 22. This is advantageous, because it enables the images captured by the image sensor 22 to be used by the fire control system, without any interference in the image processing due to the appearance of the reticle in the image.

In the foregoing embodiment, a single objective lens 16 is used both for delivering light both to the ocular 14 and to the image sensor 22. This configuration is advantageous in that it is relatively compact. In alternative embodiments, a separate objective lens is used for delivering light to the image sensor 22 and to the ocular 14. In such embodiments, there is no need for an element corresponding to beam splitter 18 for splitting the incoming light in two separate directions.

In addition to the digital reticle, the microdisplay 26 may display other types of display items. For example, microdisplay 26 may display boundaries of a target region that are calculated by a fire control system, as will be discussed further herein in connection with FIG. 4. These boundaries may be projected to overlay the image of the target that is viewed by the user through ocular 14, similarly to the projection of the reticle. In addition, the microdisplay 26 may project the entire scene that is captured by image sensor 22. This is especially useful at times of low visibility, such as at night, when the naked eye is unable to discern significant details in a landscape. Because the image sensor 22 may be far more sensitive than the human eye, especially in the infrared range, the image projected by the microdisplay may be much more useful than the image obtained directly from ocular 16. In order to prevent interference of the view with the image from micro-display, a mechanical shutter (not shown) may be configured to block light path 17, when desired.

Figure 1C:
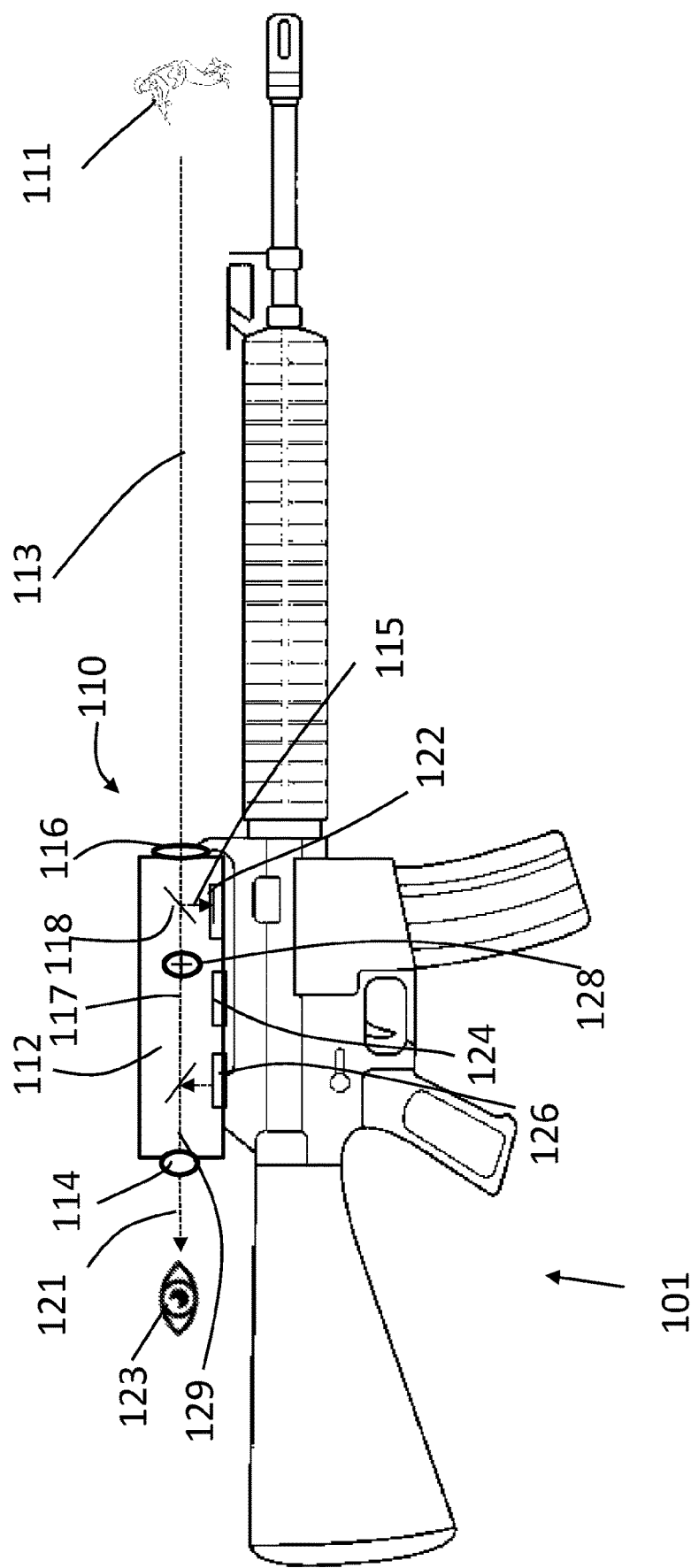
FIG. 1C is a schematic diagram of a second embodiment of a smart aiming device, with a mechanical reticle and a digital reticle, according to embodiments of the present disclosure.

FIG. 1C schematically illustrates a second embodiment of a smart aiming device 110 fitted on a rifle 101. Smart aiming device 110 is similar in many respects to smart aiming device 10, and accordingly similar reference numerals are used to refer to similar elements, except that the reference numerals begin with "1." Smart aiming device 110 differs from the previous embodiments in that an etched reticle 128 is used in addition to, or in place of a digital reticle projected from micro-display 126. Etched reticle 128, in exemplary embodiments, is a piece of glass with opaque markings etched onto the glass. Furthermore, in the illustrated embodiment, etched reticle 128 is positioned within housing 112, and is accordingly visible through ocular 114. As in the other embodiment, smart aiming device 110 includes image sensor 122 and processor 124 for locking onto a target, imaging the target, and using the imaged target for zeroing the smart aiming device 110. Etched reticle 128 is a mechanical reticle whose position may be adjusted through knobs, dials, or any other mechanism known to those of skill in the art. Alternatively, the knobs and dials may be used to move the entire housing 112, rather than etched reticle 128 within the housing 112.

Figure 2:
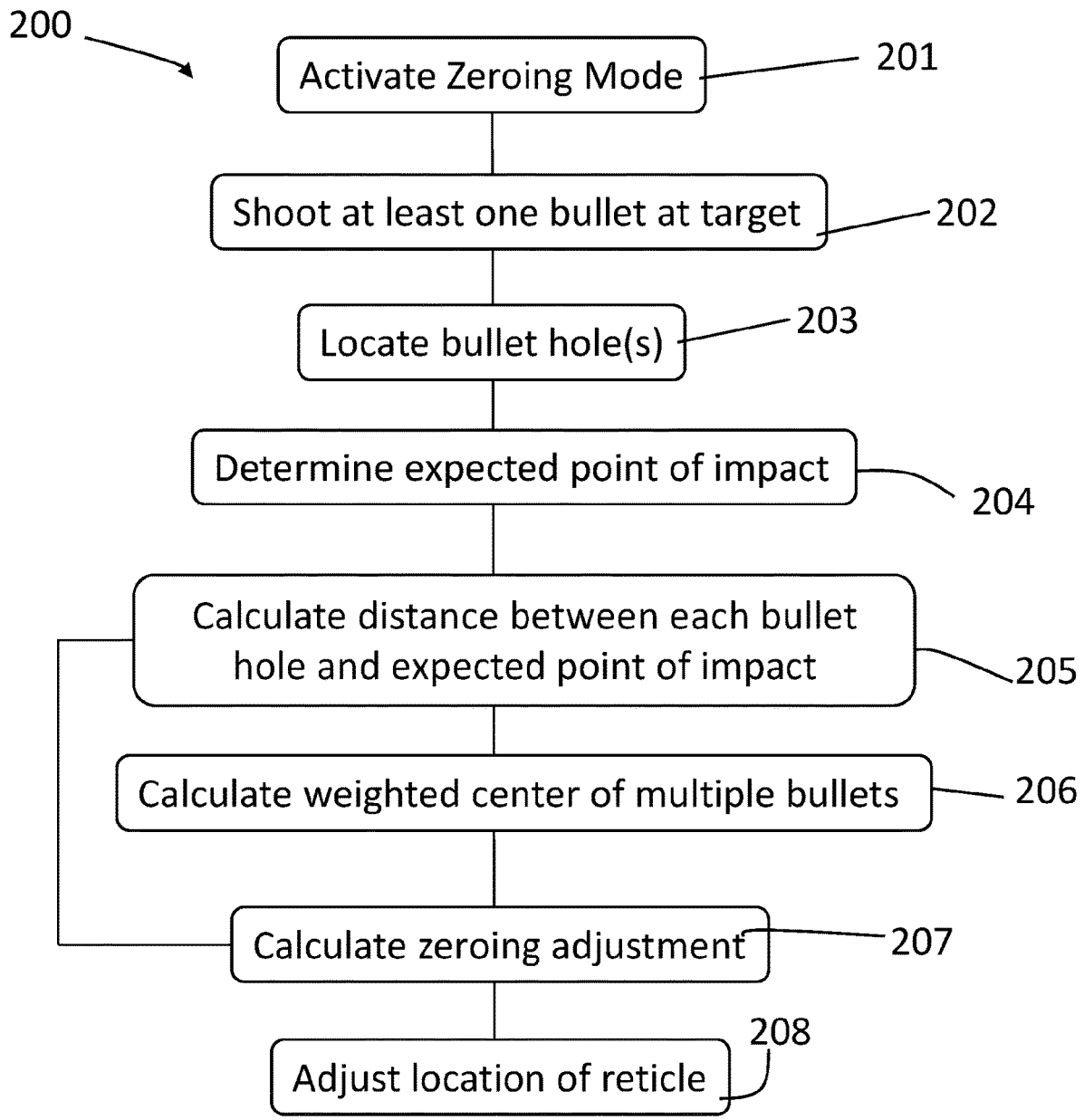
FIG. 2 depicts steps of a method for zeroing a firearm with the smart aiming device of FIGS. 1A and 1B, according to embodiments of the present disclosure.

FIG. 2 depicts steps of a method 200 for zeroing a firearm with the smart aiming device of any of the preceding Figures, according to embodiments of the present disclosure. FIGS. 3A-3E depict shots fired at a target during performance of the method 200. For ease of reference, the method 200 is described with reference to the smart aiming device 10 of FIG. 1B.

At step 201, a user optionally activates a zeroing mode of the smart aiming device 10. The zeroing mode is a software program running on the processor 24. The zeroing mode may include programming for automatically performing many of the functions described herein, such as using the image sensor 22 to identify bullet holes shot at a target, and calculating a distance between the bullet holes and one or more points of aim on the target. Use of a dedicated zeroing mode is not necessary for the performance of the remaining steps, however, and it is also possible to perform each subsequent step of the method 200, for example, by manual instruction through controller 24.

Optionally, the controller 24 enters the dedicated zeroing mode automatically. For example, the controller 24 may include image processing software that is configured to identify items within an image. The controller 24 may identify a zeroing target within an image. Upon detection of the target, the controller 24 is programmed to enter the dedicated zeroing mode. Alternatively, the user may cause the controller 24 to enter the zeroing mode through a user interface, such as a touchscreen or buttons.

At step 202, the user shoots at least one bullet at a target.

Figure 3A:
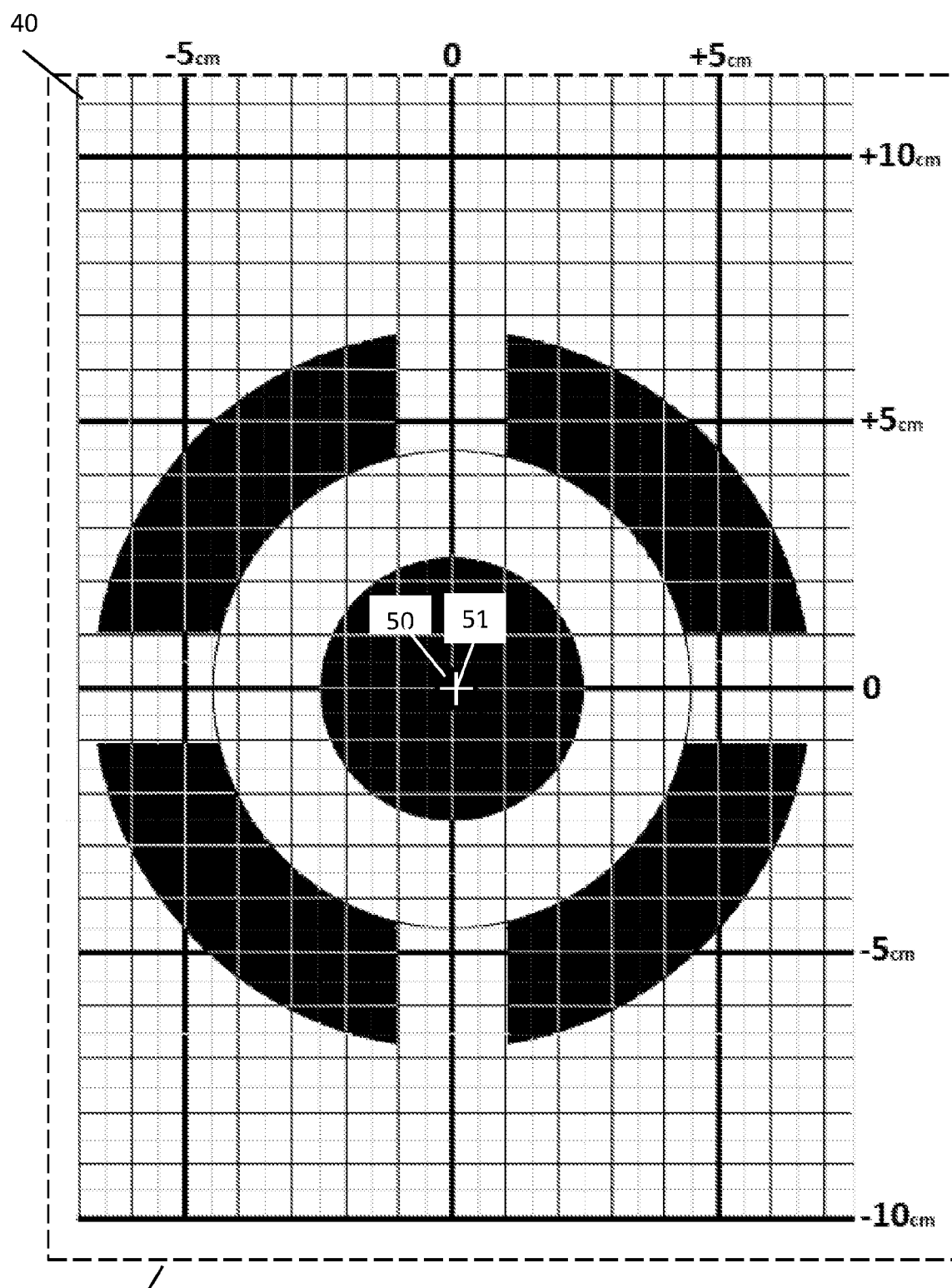
FIG. 3A depicts a target used for zeroing of a firearm, according to embodiments of the present disclosure.

FIG. 3A depicts a field of view 42 of a target 40 as viewed through an optical window 14 of smart aiming device 10, prior to firing of a bullet at the target. The target 40 is a conventional target, including a grid with gridlines, measurements, and a bulls-eye. Reticle 50 is projected as overlaid on the image of the target 40. In the view of FIG. 3A, the user has arranged the firearm such that the reticle 50 is viewed over the center of the target. However, the smart aiming device 10 is not zeroed, so that there is no certainty that a bullet shot from the firearm would land at the center of the target.

Preferably, the location of the reticle 50 is overlaid onto the target based on various baseline factors, that are considered even before the zeroing process begins. Factors that may influence the point of aim include range to the target 40, type of ammunition, muzzle velocity, environmental parameters such as wind, and height of the smart aiming device. The controller 24 uses these calculations to determine a "true" point of aim of the firearm, and to adjust the depiction of the reticle 50 on the target 40 so that the point of aim matches the projected point of impact.

Figure 3B:
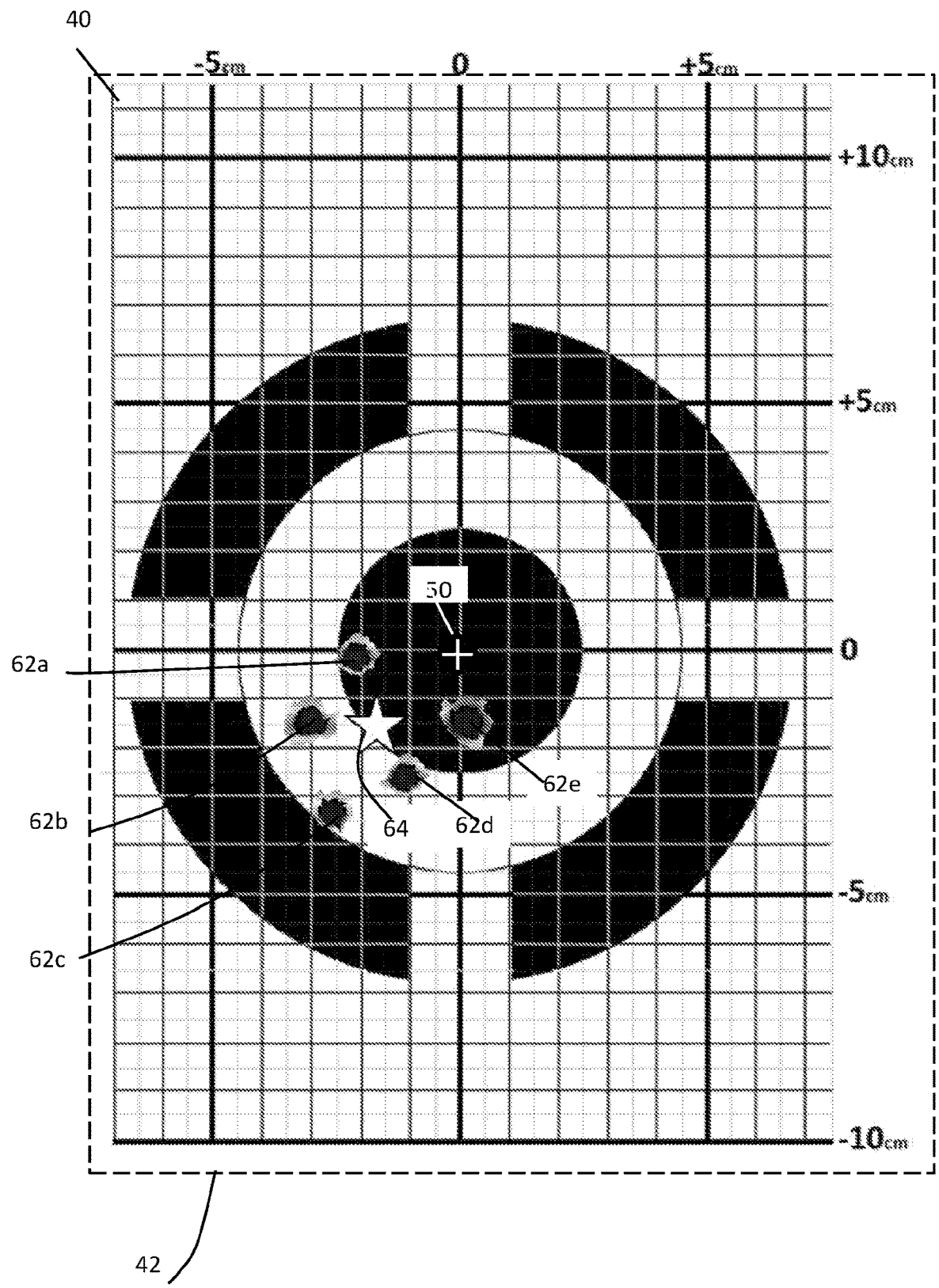
FIG. 3B depicts a shot group fired at the target of FIG. 3A, according to embodiments of the present disclosure.

FIG. 3B depicts the same target 40 following the shooting of five bullets at the target 40. Five bullet holes 62a, 62b, 62c, 62d, and 62e are visible on the target 40. Each bullet hole 62 impacts the target 40 at a point of impact of that bullet hole 62. The terms "bullet hole" and "point of impact" will be used synonymously in the present disclosure.

At step 203, the user identifies the location of each bullet hole 62 on the target 40. For example, the smart aiming device 10 may image each bullet hole 62 on the target 40. The processor then uses image processing technology in order to identify the bullet holes 62 on the target 40. Alternatively, the user may manually identify the locations of the bullet holes on the image of the target 40.

Optionally, before this imaging of the target, a user may approach the target in order to enable in focus, high-resolution capturing of the bullet holes 62 on the target. Alternatively, the user may change or add a filter or aperture of the objective lens 16, or adjust an adjustable focus and/or zoom of the aiming device, order to enable properly focused viewing of the bullet holes 62 from a distance.

At step 204, the smart aiming device 10 determines an expected point of impact for each bullet, for use in the zeroing calculation. This determination may be performed in one of several ways, and may be performed before or after the shooting of each bullet. In one alternative, the expected point of impact is a predetermined point on the target 40. For example, the expected point of impact may be a centerpoint 51 of the target 40, which, in this example, is the same point on which reticle 50 was aimed. The determination may be performed based on image processing of the image of the target 40 by image processor 26. As discussed above, image sensor 22 does not capture any image of the reticle 50 on the target 40. Thus, the image processing proceeds based only on the view of the target. The processor is programmed to determine that the target 40 is a target, determine the centerpoint of the target, and identify the centerpoint as the expected point of impact. Alternatively, the zeroing mode may be pre-programmed with dimensions of a target, including the location of the centerpoint within the target. As a result, upon identifying of a target, the zeroing mode is able to calculate the expected point of impact, without first deriving the location of the centerpoint.

Figure 3C:
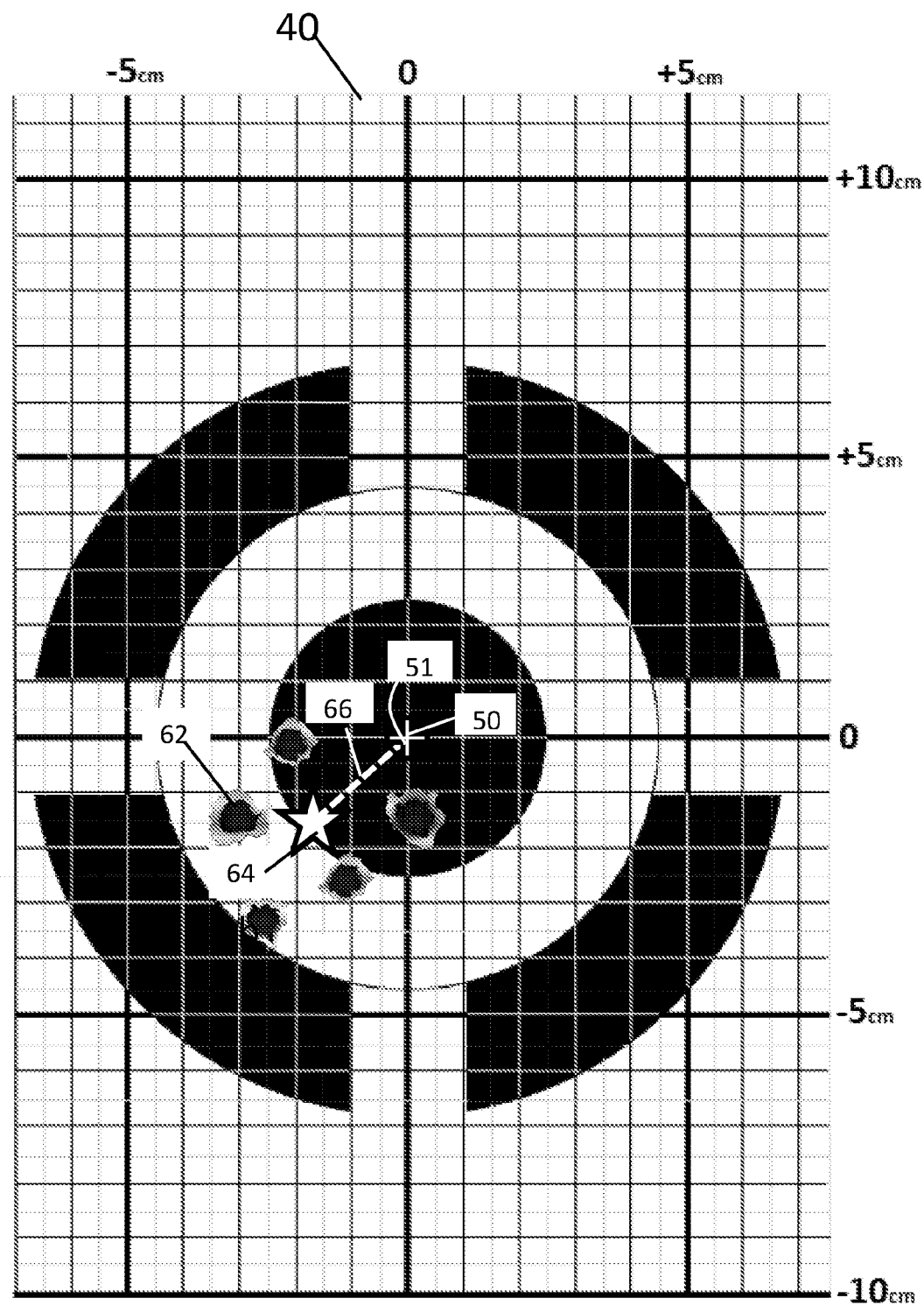
FIG. 3C depicts a process of zeroing of the aiming device based on comparison of the shot group to the center of the target, according to embodiments of the present disclosure.
Figure 3D:
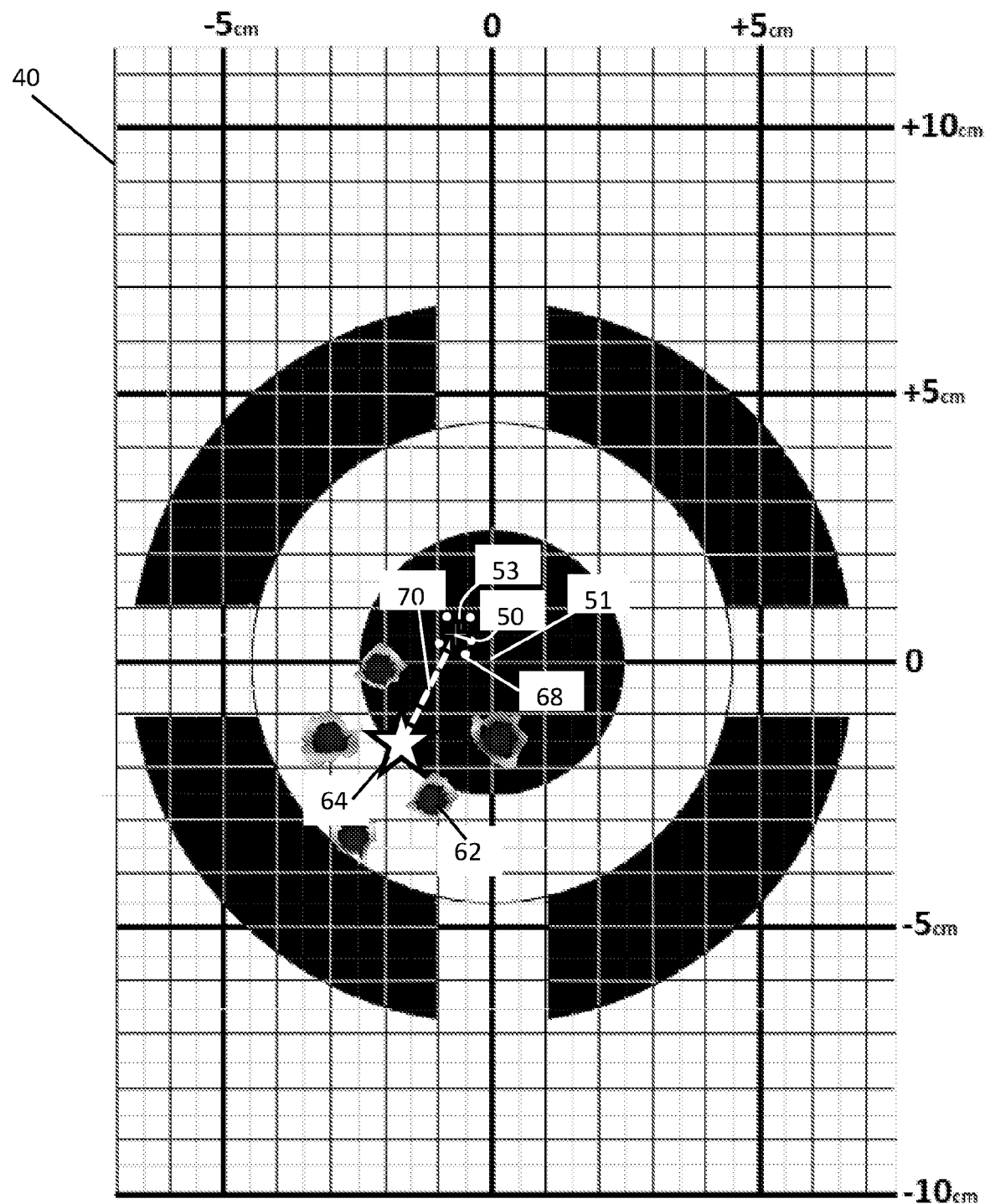
FIG. 3D depicts a process of zeroing of the aiming device based on comparison of the shot group to the locations of the reticle during firing of the shots, according to embodiments of the present disclosure.

In an alternative embodiment, as shown in FIG. 3D, the controller 24 calculates exactly on the target a point of aim of the firearm is located prior to discharge of each bullet. It is possible for the point of aim of the firearm to deviate from the centerpoint 51 of the target 40, even when the user intends to aim the reticle on the centerpoint 51. Although the reticle does not appear on the image as captured by the image sensor 22, the processor is able to calculate, at all times, the location of the reticle on the image, and therefore relative to the target. As a result, the processor 24 is able to calculate the location of the reticle at the moment before the shot relative to the target.

At step 205, the processor calculates the distance between each bullet hole and the expected point of impact. The expected point of impact may be either a point on the target, or a point of aim of the reticle, as discussed.

When there is a single bullet hole 62, the method proceeds with step 207, calculating a zeroing correction. For example, in the event that the single bullet hole is bullet hole 62e on FIG. 3B, the processor determines that the reticle 50 is displayed approximately 1.5 cm above the point of impact, and that, in order to zero the aiming device 10, it is necessary to lower the display of the reticle 50 by 1.5 cm, so that the reticle 50 appears in the location of bullet hole 62e.

When there are two or more bullet holes 62, the method proceeds with step 206, calculating a weighted center of the bullet holes 62. As used in the present disclosure, the term "weighted center" refers to a centerpoint, or the mean position of all the points in all of the coordinate positions. In the illustrated embodiments, the weighted center of the bullet holes is depicted as star 64. The zeroing correction is then calculated with respect to the weighted center 64. For example, as shown in FIG. 3C, vector 66 is drawn between the centerpoint 51 of the target 40, which is the expected point of impact, and the weighted center 64. Vector 66 includes a horizontal and vertical difference between the weighted center 64 of the points of impact 62 of the bullets and the expected point of impact, represented by centerpoint 51. Vector 66 represents the change in orientation of the reticle 50 that is required in order to zero the aiming device 10.

In FIG. 3D, vector 70 is drawn between a weighted center 53 of points of aim 68, which is determined to be the expected point of impact, and the centerpoint 64 of the bullet holes 62. The specific mechanism of determining the vector 70 may proceed in multiple ways. In one example, each point of aim is associated with the bullet hole that results from the shot fired immediately thereafter. The vector 70 for correction is calculated after every shot, and may be dynamically adjusted. Alternatively, following firing of a series of shots, the processor determines the weighted center 53 of the points of aim, and the weighted center 64 of the bullet holes 62, and calculates the vector 70 a single time.

Vector 70 results in a different zeroing correction than vector 66, and, in many instances, a more accurate correction, although at the trade-off of being more technologically complex. Notably, vector 70 is not always different than vector 66. When the system 10 is operated in conjunction with a fire control system, as will be discussed further herein, the weighted center 53 of the points of aim typically converges to the centerpoint 51 of the target 40. This results in the two forms of calculation causing identical outputs.

Optionally, instead of waiting to calculate the zeroing correction after completion of a fixed set of shots (for example, five shots), the processor 24 is configured to calculate the zeroing correction after a single shot, and to update the zeroing correction following every subsequent shot. For example, and referring to FIG. 3B, following firing of two bullets leaving bullet holes 62a and 62e, the processor may calculate a zeroing correction to the midpoint of those two bullet holes. After a third bullet hole is shot, the processor updates the zeroing correction based on a weighted center of those three bullet holes. The processor continues to update the weighted center, and thus the zeroing calculation, after each bullet is shot. As a result, a user may complete the zeroing process at any time that he or she believes that enough shots have been fired to achieve an accurate zeroing. This bullet-by-bullet zeroing is available for both the embodiment of FIG. 3C and the embodiment of FIG. 3D, as discussed.

At step 208, the location of the reticle is adjusted relative to the bore of the firearm based on the calculated correction. For example, for a digital reticle, the controller causes the display of the reticle to be adjusted so that it appears displaced in the direction of the vector 66, in the example of FIG. 3C, or vector 70, in the example of FIG. 3D. When the reticle 50 is thus adjusted, the reticle 50 indicates a zeroed point of impact on the target 40 on which a subsequent bullet shot from the firearm is expected to impact.

Optionally, the controller 24 issues a proposed adjustment for the digital reticle for the user to approve prior to execution of the adjustment. This enables quality control by the user, if desired. Alternatively, the controller 24 may automatically perform the adjustment without requiring user approval.

When the system includes a mechanical reticle, such as etched reticle 128, the smart aiming device 10 may provide instructions to a user to mechanically adjust a location of the mechanical reticle. Such instructions may be communicated, for example, on a display screen of the smart aiming device. In addition or alternatively, when the system includes both a digital reticle and a mechanical reticle, the system may automatically update the location of the digital reticle, and then a user may manually adjust the location of the mechanical reticle based on the adjustment of the digital reticle. In such embodiments, the mechanical reticle serves as a backup for the digital reticle. In addition, there is no need to program a display for communicating instructions to a user for adjusting the mechanical reticle.

Figure 3E:
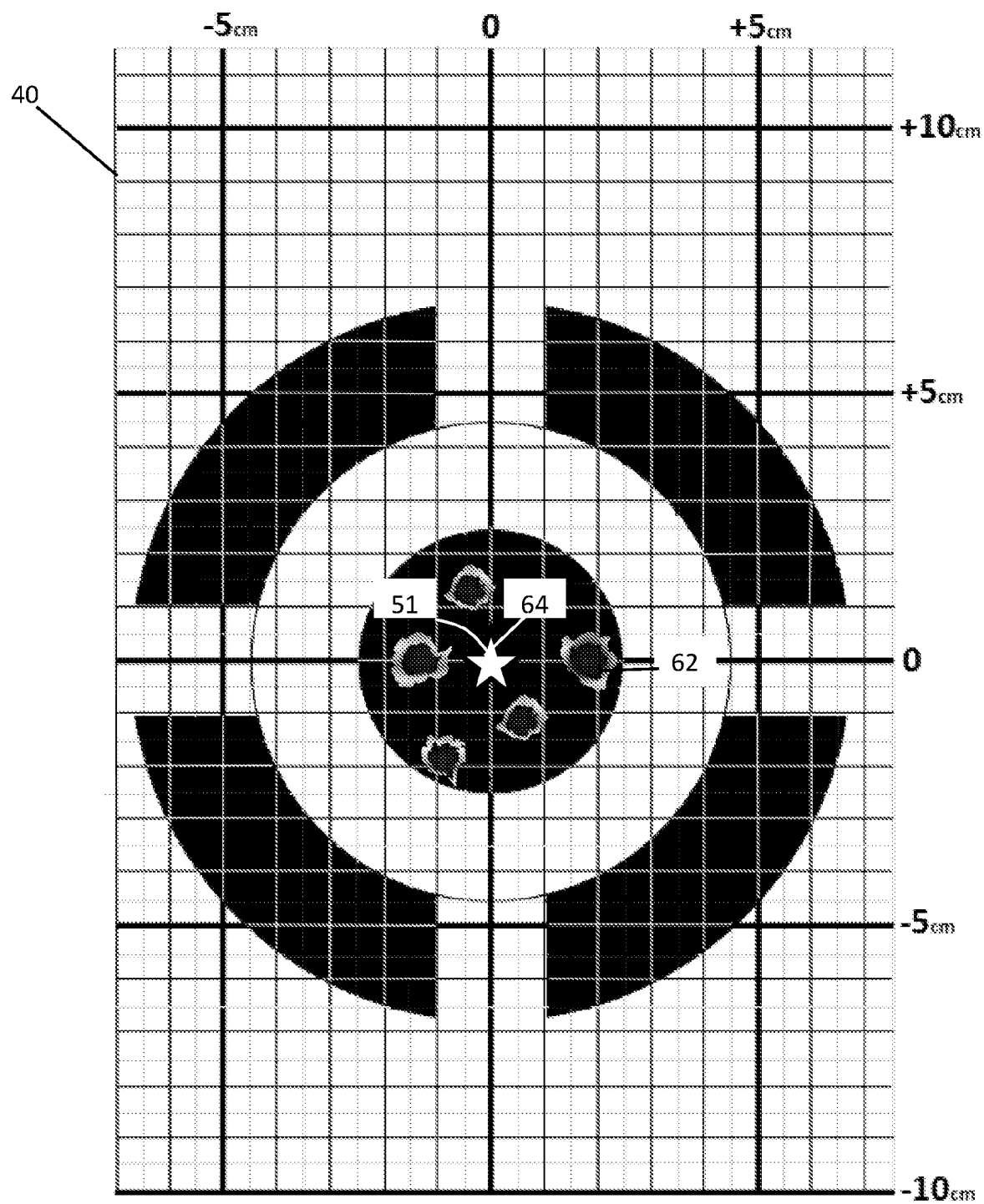
FIG. 3E depicts shots fired at the target from the zeroed aiming device, according to embodiments of the present disclosure.

FIG. 3E depicts a pattern of bullets shot from a zeroed firearm. The weighted center 64 of the bullet holes 62 is at the centerpoint of the target 51.

Figure 4:
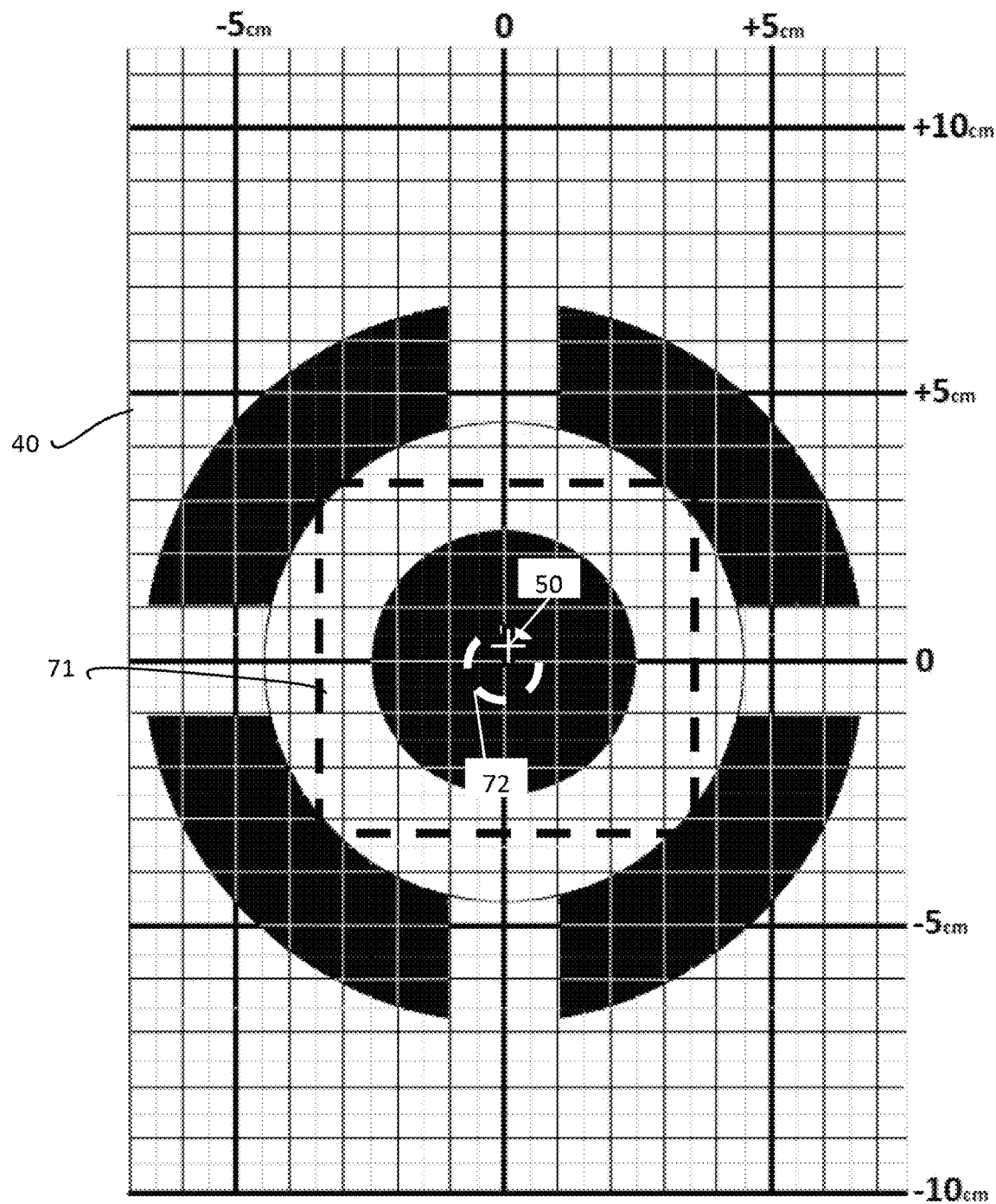
FIG. 4 depicts locking on to the target with a fire control system, according to embodiments of the present disclosure.

FIG. 4 depicts use of a fire control system during the zeroing process, according to embodiments of the present disclosure. The fire control processor identifies, for example, central portion 71 of target 40 as the target region for the zeroing. Portion 71 is referred to herein as the "zeroing target." The specific size of the zeroing target 71 may be programmed or adjusted as desired. Optionally, zeroing target 71 may be sized differently during zeroing of the firearm as compared to regular operation of the firearm. Following locking on to the zeroing target 71, the firing processor tracks the zeroing target 71. The firing processor times a firing of the firearm so that the firearm will fire when the firing processor determines that the locked-on zeroing target will be hit in a desired hit area within zeroing target 71, demarcated by circle 72. For example, the firing processor may monitor the location of the reticle 50 on the target 40. The reticle location 50 may represent the expected point of impact, and may be fine-tuned based on factors such as range, type of ammunition, muzzle velocity, height, and environmental conditions, as discussed above. The firing processor may evaluate whether the reticle 50 is within hit area 72, or is within a certain distance from hit area 72. The firing processor times the firing so that the bullet will hit within hit area 72. Optionally, if the reticle is not close enough to the hit area 72, the firearm will not discharge at all.

Timing the firing may be accomplished in multiple ways. One possibility is to mechanically block the trigger from being depressed the entire way, and then unblocking it at the right moment. Other possible implementations may include a purely electronic trigger control, in which a user presses a trigger, but the striking pin is electronically controlled, and will not activate until a confirmation is received from the firing processor. There are also various hybrid solutions between mechanical and electrical firing control, most of which include changes to internal components of the trigger mechanism of the weapon.

Advantageously, using a fire control system during the zeroing process minimizes the range of locations on the target 40 on which a bullet may impact. This, in turn, reduces the likelihood of including outlier shots in the zeroing calculation that do not represent a true result of the calibration of the firearm. For example, a bullet may accidentally be misfired and reach a certain region of the target, but this location does not characterize the zeroing of the firearm. If this bullet hole were included in the calculation of the zeroing, it would result in an erroneous zeroing. The fire control system prevents such erroneous results from being included in any zeroing calculation.

Figure 5:
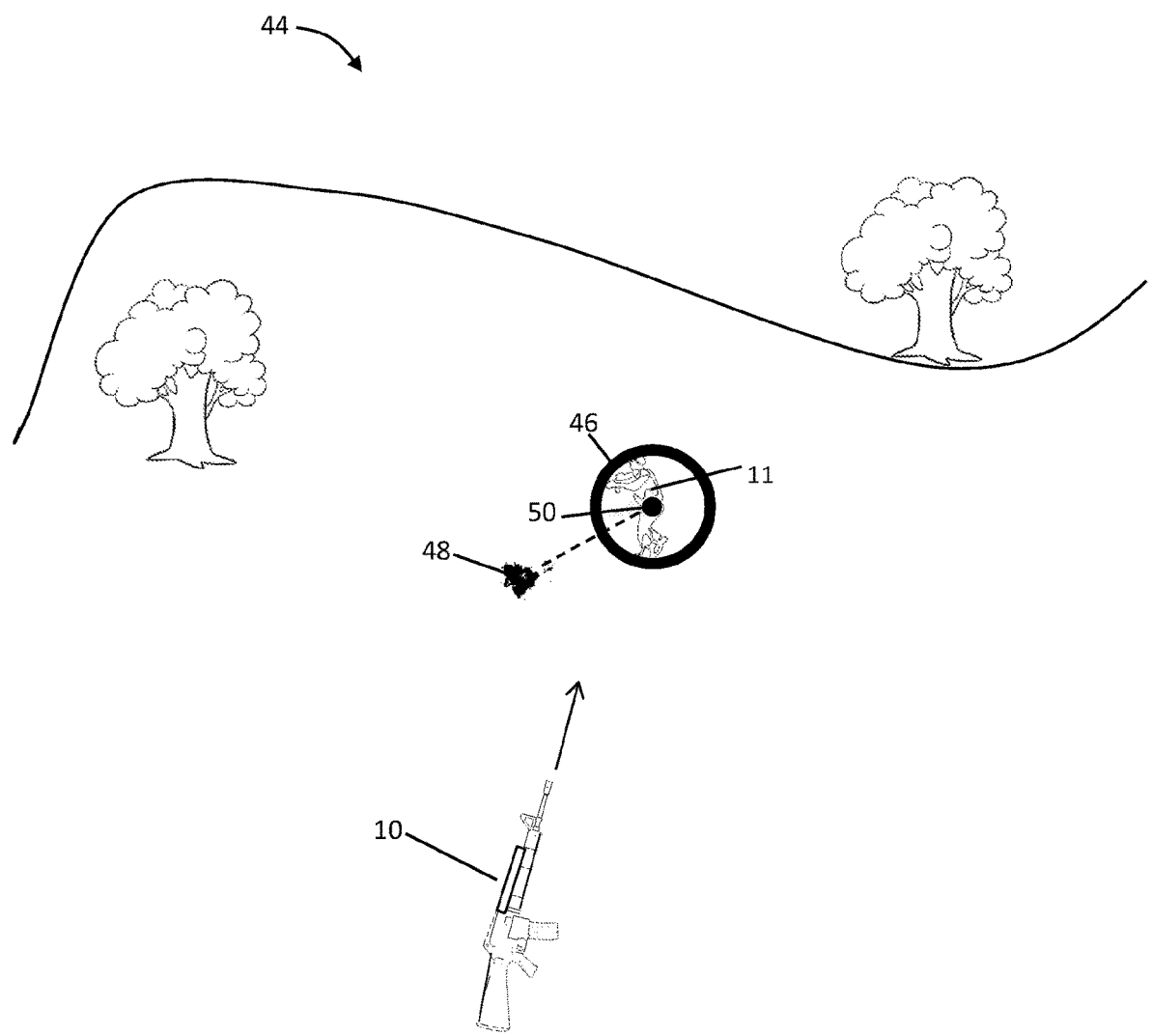
FIG. 5 depicts zeroing of an aiming device following firing of one or more shots into a field setting, according to embodiments of the present disclosure.

FIG. 5 schematically illustrates use of any of the previously described smart aiming devices 10, 110 for zeroing in a field or battle setting. In a field setting, there is no target available for identifying and measuring the point of impact relative to the point of aim. However, the image sensor of the smart aiming device is able to detect changes in an environment resulting from the bullet impact, and use those changes in order to determine the point of impact.

For example, in FIG. 5, a firearm with smart aiming device 10 is aimed at target 11. Target 11 may be at a measured or known range. Reticle 50 is aimed at a center of the target 11. In the illustrated embodiment, reticle 50 includes circle 46, which may also be used for providing aiming assistance. The user fires one or more bullets, using the reticle 50 to aim. The bullets land at the ground to the side of the target 11, causing a spray of dirt 48 to rise in the air.

The smart aiming device 10 then captures an image of the scene, which includes the area in which the bullet actually landed, also referred to herein as the bullet hit region. Using image processing technology, the processor determines the exact bullet impact location based on changed features in the bullet hit region, such as the spray 48. Alternatively, the user marks the exact bullet impact location on the image. The processor than calculates the distance between the location and the expected point of impact represented by reticle 50, calculates the zeroing adjustment, and performs or instructs performance of the zeroing correction. As in the previous embodiments, the adjustment of the location of the reticle may be performed by the smart aiming device itself, on a digital reticle, optionally after approval of a proposed adjustment by a user. Alternatively, the adjustment may be performed by a user on a mechanical reticle, according to instructions issued by the smart aiming device 10.

The field zeroing described above may be performed during operational shooting. In other words, it is not necessary for the user to fire a bullet for the sole purpose of zeroing. Rather, while the user is firing at targets, the processor is able to determine zeroing corrections, and to execute these corrections or suggest these corrections to the user for implementation.

The invention claimed is:

1. A method for zeroing a smart aiming device on a firearm, wherein the smart aiming device comprises an image sensor, a processor, and an adjustable reticle for aiming said aiming device, the method comprising:
    activating a dedicated zeroing mode;
    shooting at least one bullet on a zeroing target while aiming the firearm on said target using said reticle to determine an expected point of impact of said at least one bullet on the zeroing target;
    imaging the zeroing target with the image sensor;
    based on image processing of an image captured by the image sensor, identifying, with the processor, a location of at least one bullet hole formed by the at least one bullet on the target, and calculating, with the processor, a distance between each bullet hole and the expected point of impact;
    calculating, with the processor, a zeroing adjustment of a location of the reticle respective to a bore of the weapon, based on the calculated at least one distance, for thereby indicating a zeroed point of impact on the target on which a subsequent bullet shot from the firearm is expected to impact; and
    performing the zeroing adjustment,
    wherein, when at least two bullets are fired, the zeroing adjustment is calculated based on:
        following firing of a first bullet at the target, identifying a point of impact of the fired bullet on the target, calculating the distance between the point of impact and the expected point of impact, and calculating the zeroing adjustment of the reticle based on the calculated distance, and following firing of each subsequent bullet after the first bullet, calculating a weighted center of the points of impact of the first bullet and each subsequent bullet, calculating a distance between the weighted center and the expected point of impact, and updating the zeroing adjustment, or following firing of all of the at least two bullets at the target, identifying a point of impact of all of the bullets on the target, calculating the weighted center of the points of impact, and calculating a distance between the weighted center and the expected point of impact, and calculating the zeroing adjustment based on the calculated distance between the weighted center and the expected point of impact.

2. The method of claim 1, wherein the activating step comprises:

imaging the zeroing target, and identifying the zeroing target within the image; and upon identifying the imaged zeroing target, automatically entering said dedicated zeroing mode.

3. The method of claim 1, wherein the reticle is a digital reticle.

4. The method of claim 3, further comprising determining a position of said digital reticle taking into account at least one of range to the target, type of ammunition, muzzle velocity, environmental parameters, and height of the smart aiming device, and projecting the digital reticle onto the field of view based on such determining, so that a point of aim corresponds with the projected point of impact.

5. The method of claim 3, wherein the step of performing the zeroing adjustment comprises issuing, with the processor, a proposed adjustment for the digital reticle for approval by a user, and approving the proposed adjustment.

6. The method of claim 1, wherein the reticle is a mechanical reticle, and the step of performing the zeroing adjustment comprises providing guidance to a user to mechanically adjust a location of the mechanical reticle, and executing said instructions.

7. The method of claim 1, wherein the reticle comprises both a mechanical reticle and a digital reticle, and the method comprises first performing the zeroing adjustment on the digital reticle, and subsequently mechanically adjusting the mechanical reticle to match the zeroing adjustment of the digital reticle.

8. The method of claim 1, wherein said expected point of impact is a predetermined point on the zeroing target.

9. The method of claim 1, wherein said expected point of impact is a direction of the reticle at a time prior to bullet discharge.

10. The method of claim 1, further comprising, during or prior to the imaging step, changing or adding a filter or aperture to a lens assembly of the image sensor, or refocusing a movable lens assembly of the image sensor, to enable a properly focused view of the target.

11. The method of claim 1, further comprising, with a fire control system having a firing processor:

locking onto the zeroing target;

tracking said zeroing target; and timing a firing of the firearm so as to fire the firearm when the firing processor determines that the locked-on zeroing target will be hit in a desired hit area.

12. The method of claim 11, wherein the locking step comprises identifying the zeroing target by processing an image of the zeroing target, said image not including a depiction of the reticle.

13. A method for zeroing a smart aiming device on a firearm, wherein the device comprises an image sensor, a processor, and an adjustable reticle for aiming said aiming device, the method comprising:

shooting at least one bullet while aiming the firearm using said reticle to determine an expected point of impact of said at least one bullet;

imaging a bullet hit region with the image sensor;

based on an image captured by the image sensor, identifying an exact bullet impact location by identifying changed features in the bullet hit region caused by impact of the bullet, and calculating a distance between each at least one bullet impact location and each corresponding expected point of impact;

calculating a zeroing adjustment of a location of the reticle respective to a bore of the firearm, based on the calculated distance, for thereby indicating a zeroed point of impact on which a subsequent bullet shot from the firearm is expected to impact; and performing the zeroing adjustment, wherein a position of the reticle is digitally adjustable and mechanically adjustable, such that the position of the reticle can be adjusted digitally or mechanically.

14. The method of claim 13, wherein the reticle is a digital reticle, and the step of performing the zeroing adjustment comprises issuing, with the processor, a proposed adjustment for the digital reticle for approval by a user, and approving the proposed adjustment.

15. The method of claim 13, wherein the reticle is a mechanical reticle, and the step of performing the zeroing adjustment comprises providing guidance to a user to mechanically adjust a location of the mechanical reticle, and executing said instructions.

16. A system for zeroing a smart aiming device installed on a firearm, comprising:

an adjustable reticle;

an image sensor configured to capture images of a target region, wherein the reticle is not visible on the captured images;

a plurality of filters or apertures for an optical element of the image sensor, or a moving lens assembly, so that the image sensor is able to view the target at a proper focus;

an optical window for viewing a target therethrough via at least one of an optical lens or a micro-display of a video of the target region captured by the image sensor injected into the optical window, wherein said reticle is also visible via the optical window;

a processor, and a non-transitory computer readable medium having stored thereon software instructions, that when executed by the processor, causes the processor to perform the following steps:

activating a dedicated zeroing mode;

imaging the zeroing target with the image sensor;

following shooting of at least one bullet at the zeroing target, identifying a location of at least one bullet hole formed by the at least one bullet on the target, based on an image imaged by the image sensor, and calculating a distance between each bullet hole and the expected point of impact;

determining an expected point of impact of at least one bullet on a zeroing target; and determining a zeroing adjustment of the reticle respective to a bore of the firearm, based on the calculated at least one distance, such that following the adjustment the reticle indicates a zeroed point of impact on the target on which a subsequent bullet shot from the firearm is expected to impact.

17. The system of claim 16, further comprising a fire control system, the fire control system comprising user controls for locking onto a hit area within the target, an epsilon logic module configured to track said hit area, and a firing processor configured to time a firing of the firearm so that the firearm will fire when the firing processor determines that the locked-on zeroing target will be hit in a desired hit area.

\* \* \* \* \*